US011093861B2

(12) United States Patent
Yan et al.

(10) Patent No.: US 11,093,861 B2
(45) Date of Patent: Aug. 17, 2021

(54) CONTROLLING ITEM FREQUENCY USING A MACHINE-LEARNED MODEL

(71) Applicant: Microsoft Technology Licensing, LLC, Redmond, WA (US)

(72) Inventors: Jinyun Yan, Sunnyvale, CA (US); Vinay Praneeth Boda, Mountain View, CA (US); Yin Zhang, Sunnyvale, CA (US); David Pardoe, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 16/359,914

(22) Filed: Mar. 20, 2019

(65) Prior Publication Data

US 2020/0302333 A1 Sep. 24, 2020

(51) Int. Cl.
*G06N 20/00* (2019.01)
*G06F 3/0482* (2013.01)
*G06N 5/04* (2006.01)

(52) U.S. Cl.
CPC .......... *G06N 20/00* (2019.01); *G06F 3/0482* (2013.01); *G06N 5/048* (2013.01)

(58) Field of Classification Search
CPC ....... G06N 20/00; G06N 5/048; G06F 3/0482
USPC .......................................................... 706/11
See application file for complete search history.

(56) References Cited

U.S. PATENT DOCUMENTS

| 9,117,227 | B1 * | 8/2015 | Agrawal | G06Q 30/0242 |
| 9,361,322 | B1 * | 6/2016 | Dutta | G06F 16/335 |
| 10,163,133 | B2 * | 12/2018 | Srivastava | G06F 17/30528 |
| 10,516,644 | B2 * | 12/2019 | Shi | G06N 20/00 |
| 10,657,556 | B1 * | 5/2020 | Lu | G06Q 30/0243 |
| 10,671,680 | B2 * | 6/2020 | Yan | G06Q 30/0201 |
| 10,769,677 | B1 * | 9/2020 | Agrawal | G06F 16/9535 |
| 10,853,736 | B2 * | 12/2020 | Yan | G06Q 10/1053 |
| 2012/0066053 | A1 * | 3/2012 | Agarwal | G06Q 50/01 705/14.41 |
| 2019/0121350 | A1 * | 4/2019 | Cella | H04L 67/12 |

* cited by examiner

*Primary Examiner* — William D Titcomb
(74) *Attorney, Agent, or Firm* — Hickman Becker Bingham Ledesma LLP (57) ABSTRACT

Techniques for controlling item frequency using machine learning are provides. In one technique, two prediction models are trained: one based on interaction history of multiple content items by multiple entities and the other based on predicted interaction rates and an impression count for each of multiple content items. In response to a request, a particular entity associated with the request is identified and multiple candidate content items are identified. For each identified candidate content item, the first prediction model is used to determine a predicted interaction rate, an impression count of the candidate content item is determined with respect to the particular entity, the second prediction model is used to generate an adjustment based on the impression count, and an adjusted entity interaction rate is generated based on the predicted interaction rate and the adjustment. A particular candidate content item is selected based on the generated adjusted entity interaction rates.

20 Claims, 5 Drawing Sheets

CONTROLLING ITEM FREQUENCY USING A MACHINE-LEARNED MODEL

TECHNICAL FIELD

The present disclosure relates to machine learning and, more particularly, to training a model for controlling how frequently a content item may be transmitted over a computer network to individual entities.

BACKGROUND

The Internet allows end-users operating computing devices to request content from many different publishers. Some publishers desire to send additional content items to users who visit their respective websites or who otherwise interact with the publishers. To do so, publishers may rely on a content delivery service that delivers the additional content items over one or more computer networks to computing devices of such users. Some content delivery services have a large database of content items from which to select. In some instances, a content delivery service transmits the same content item over a computer network to the same end-user multiple times over a relatively short period of time. A content item that is presented multiple times to the same user is referred to herein as a "repeated content item." Repeated displays of a content item may cause the user to ignore the content item, to not visit the publisher that presented the content item as frequently in the future, or, worse, to not pay attention to other content items of the same type.

One approach is to address this problem of inattention to repeated content items is to control how frequently a content item can be shown to a user. One mechanism is referred to herein as a frequency cap (or f-cap) rule. An example of an f-cap rule is that the same content item cannot be presented to the same user more than three times in one week. F-cap rules are manually composed and have multiple disadvantages.

One disadvantage is that f-cap rules are unlikely to be updated regularly to keep up with changes in supply and demand and online user behavior. Another disadvantage is that f-cap rules are typically reset after a period of time (e.g., 48 hours) with respect to a content item-user pair and, thus, cannot capture user feedback towards repeated content items outside that period of time. Another disadvantage is that f-cap rules are applied globally and, therefore, ignores differences in different user responses towards repeated content items. Another disadvantage is that an f-cap rule is equivalent to setting the effective resource reduction amount per impression to zero, which unnecessarily reduces the depth of a content item selection event.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for using machine learning to control the frequency with which content items are transmitted over computer networks to client devices are provided. In one technique, a machine-learned model is trained based on multiple features to learn coefficients for different impression counts. Output of the machine-learned model is used to adjust a predicted user interaction (e.g., click) rate associated with a content item in order to predict a user's propensity toward interacting with the content item.

Embodiments allow for the generation of adjusted user interaction rates, which are used to control content item frequency without relying on f-cap rules, while improving user experience. Embodiments also have the benefit of increased depth of content item selection events that a content delivery system conducts in real-time.

System Overview

Figure 1:
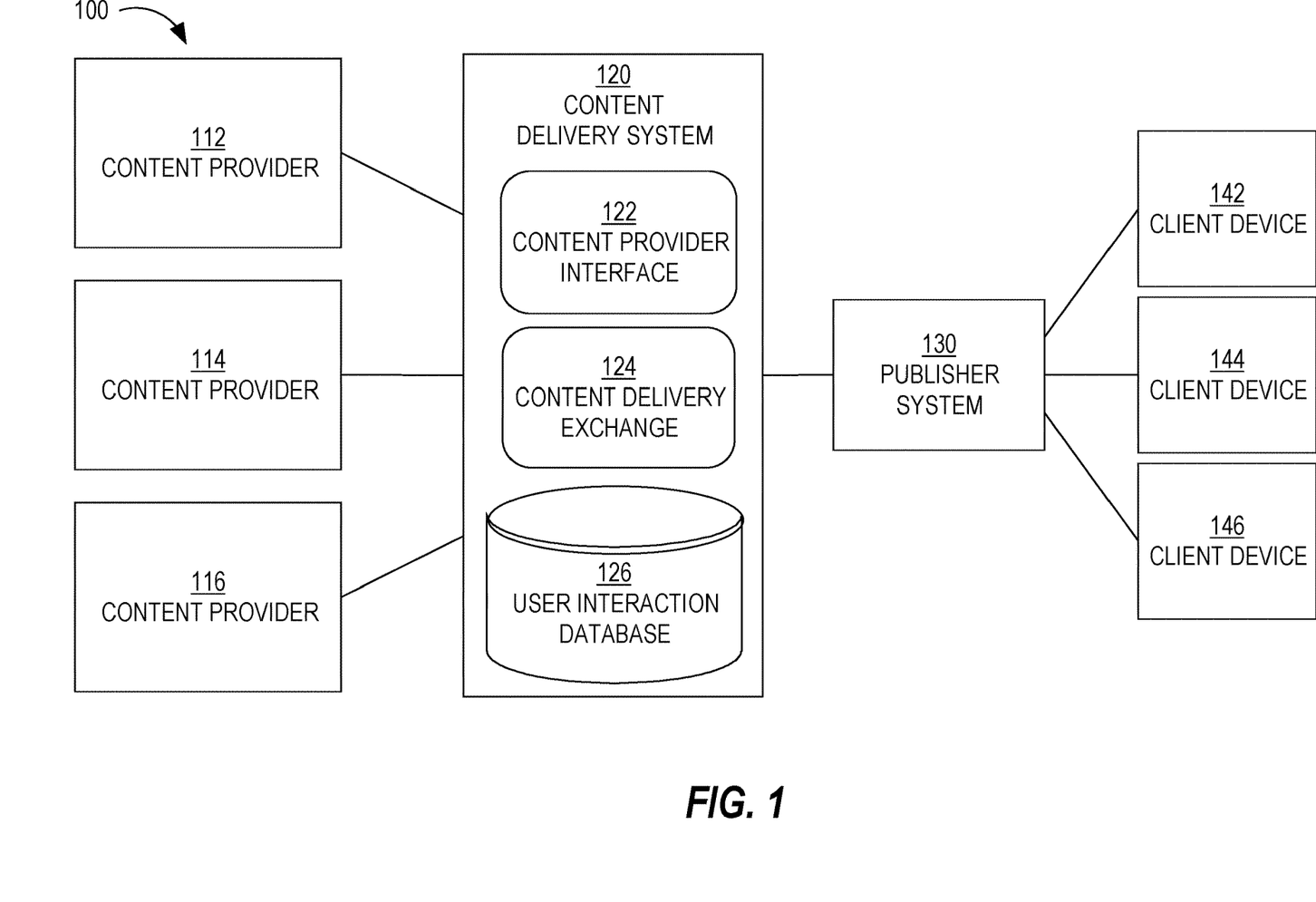
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a resource reduction amount (also referred to as a bid amount) that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or an interaction data set. Thus, content delivery system 120 may include a user interaction database (not depicted). Logging such events allows content delivery system 120 to track how well different content items, campaigns, and/or content providers perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

User Interaction Prediction Model

Some prediction models generate a prediction of whether an entity (or user) will interact with a content item given information about the user and the content item. Examples of types of interaction include a selection (in the case of static content, such as text and an image) or a view (in the context of dynamic content, such as video that is being played). User interaction with a content item may be inferred based on how long the content item is presented on screen of a computing device. For example, if video of a video item is played for two seconds on a visible portion of the user's screen, then a "view" of, or a "user interaction" with, the video item is inferred. Examples of user selection of a content item include a "click" (such as the user tapping a finger on a touchscreen display where the content item appears or using a button on a computer mouse while the cursor is presented over or near the content item), selecting a physical button of a computing device while the content item is highlighted, and a voice command that is interpreted by software as being a selection of the content item.

In an embodiment, examples of user features of a prediction model that predicts user interaction with respect to a content item include observed (or actual) user interaction rate of the user with respect to all content items presented to the user, job title of the user, job industry, geographical location, employment status, current employer, attributes of the current employer (e.g., company size, industry), past employers (if any), academic institutions attended, academic degrees earned, number of connections in a social network, number of connection invitations sent, number of connection invitations received, endorsements, skills, and interests.

In an embodiment, examples of content item features of a prediction model that predicts user interaction with respect to a content item include observed (or actual) user interaction rate of the content item (if there is content delivery history of the content item), observed user interaction rate of content items of a content delivery campaign to which the content item belongs (if the campaign includes multiple content items), observed user interaction rate of content items of a content provider that initiated the content delivery campaign, attributes of the content provider (e.g., associated job industry), and attributes of the content item (e.g., amount of text, specific words that are used, whether the content item includes an image, attributes of that image, etc.).

The prediction model presumes that each user pays attention to every impression (i.e., each content item that is presented to the user) and predicts whether the user will interact with (e.g., click on) the content item of the impression. However, a user might not pay attention to the content item, especially repeated content items. One option is to include, as a feature to an existing user interaction prediction model, a number of times that the corresponding user has been presented the corresponding content item. However, there are disadvantages to this approach. For example, training a new prediction model cannot guarantee how low a prediction will be in light of an impression count. Even though the coefficient for the impression count might be negative, it is difficult to guarantee that the coefficient is always negative when a new prediction model is iterated (or trained) and new features are added. Thus, in the future, some iteration of the prediction model might make the coefficient small enough, such that the impression count would play a negligible role in the final prediction. As a result, removing or even relaxing any f-cap rule might be dangerous, in that user experience might suffer with too many repeated content items.

Attention Model

In an embodiment, predicted user interaction is modeled as p(interaction)=p(interaction|attention)*p(attention), where "p" refers to a probability. The probability of paying attention to a content item (i.e., p(attention)) is a function of the count of previous impressions at a given point in time. In a related embodiment, p(attention) is also a function of a time gap from the last seen impression, and impression counts at different granularity, such as content provider level and different granularity of time period.

As observed in tracking data, the greater the number of previous impressions of a content item, the less likely the corresponding user will interact with the content item. Thus, p(attention) discounts the initial predicted user interaction rate produced by the prediction model when the impression count of a content item is high with respect to the user. This is referred to as "impression discounting."

Adjusted Predicted User Interaction Rates

Figure 2:
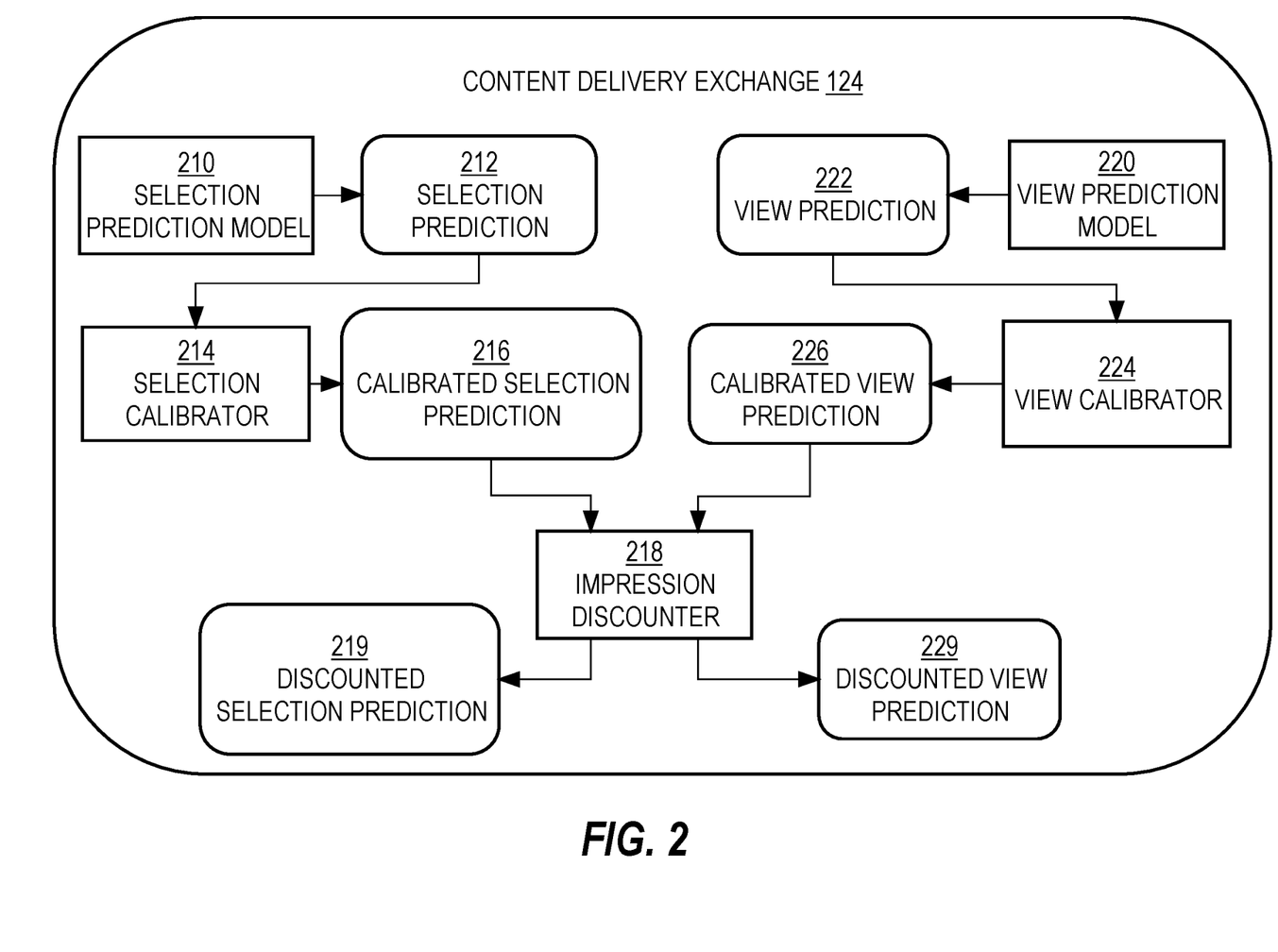
FIG. 2 is a block diagram that depicts example components of a content delivery exchange used to generate an adjusted predicted user interaction rate using impression discounting, in an embodiment.

FIG. 2 is a block diagram that depicts example components of content delivery exchange 124 used to generate an adjusted predicted user interaction rate using impression discounting, in an embodiment. In the depicted example, content delivery exchange 124 includes a selection prediction model 210, a selection calibrator 214, an impression discounter 218, a view prediction model 220, and a view calibrator 224. Selection prediction model 210 and selection calibrator 214 are for predicting selections (e.g., clicks) while view prediction model 220 and view calibrator 224 are for predicting views, such as views of video items. Thus, view prediction model 220 may be used exclusively for video content items (or simply "video items") while selection prediction model 210 may be used exclusively for non-video content items. Other embodiments only include one type of prediction model.

Selection prediction model 210 takes, as input, user data about a particular user and content item data about a particular content item and produces, as output, prediction 212 of a selection. Selection prediction 212 may be presented as a percentage or a decimal value, such as 0.04103. Similarly, view prediction model 220 takes, as input, user data about a particular user and content item data about a particular content item and produces, as output, a prediction 222 of a view. Like selection prediction 212, view prediction may be presented as a percentage or a decimal value, such as 0.0287. The occurrence of a "view" may be defined by the length of time a content item is presented or a video is played, such as three seconds.

Selection calibrator 214 takes, as input, selection prediction 212 and produces, as output, a calibrated selection prediction 216. In order to produce calibrated selection prediction 216, selection calibrator 214 may have calculated (or another component may have calculated) a ratio of an observed (or actual) user interaction rate to a previous predicted user interaction rate. The observed and previous user selection rates may be calculated based on tracking data limited to selection rates of the content item in question, to selection rates of only content items from the same content delivery campaign of the content item in question, to selection rates of content items from the same content provider of the content item in question, or to selection rates of all previously-transmitted content items (or a subset thereof, such as the last four weeks). Selection calibrator 214 multiplies selection prediction 212 by the ratio to compute calibrated selection prediction 216.

Additionally or alternatively, selection calibrator 214 computes an EE value, or an "explore and exploit" value. An EE value may be generated dynamically (and randomly) for each content item or for certain content items, such as "new" content items (or content items for which there is very little user behavior history) or content items that are associated with relatively low predicted rates, either at the time of generating the predicted values or over a period of time (e.g., two days). The randomness may be bounded by a (e.g., normal) distribution around selection prediction 212. For example, the EE value is limited to the range defined by +/−(0.1*selection prediction 212). A purpose of the EE value is to allow content items that have low predicted values to have a chance to be presented more often than they otherwise would. At the same time, content items that have consistently high predicted values may have their predicted values increase at times, in which case (as a result of being presented more often) it may be learned that the observed rate increases significantly.

View calibrator 224 may operate similarly to selection calibrator 214 and produce calibrated view prediction 226 based on view selection 222.

Impression discounter 218 takes, as input, calibrated selection prediction 216 and an indication of repeated impressions and produces, as output, discounted selection prediction 219. An indication of repeated impressions may be a value (e.g., "0" or "1") indicating whether the content item has been presented to the user in the past. Alternatively, the indication may be an actual number of times the content item has been presented to the user in the past (e.g., "5").

Similarly, in the scenario of video items, impression discounter 218 takes, as input, calibrated view prediction 226 and an indication of repeated impressions and produces, as output, discounted view prediction 229.

Impression Discounting Phases

In an embodiment, impression discounter 218 is implemented in multiple phases. In the first phase, f-cap rules are maintained. In this phase, impression discounter 218 positively adjusts predicted user interaction rates for "fresh" content items (or candidate content items that have not been presented to a particular user who is subject of a content item selection event). In other words, p(attention impression count=0)=freshnessBooster>1.

In the second phase, f-cap rules are relaxed or removed altogether. This approach may lead to an increase in resources earned, driven by an increase in the depth of content item selection events. As an example, given a current f-cap rule, content item A is filtered out of a content items selection event, but would not be filtered out by a new (relaxed) f-cap rule or a non-existent one. Assuming that, as a result of a content item selection event, the winning content item is B with support of content item C, there are three outcomes with content item A entering the auction where it was previously filtered out:
1: ecpi(B)>ecpi(C)>ecpi(A)
2: ecpi(A)>ecpi(B)>ecpi(C)
3: ecpi(B)>ecpi(A)>ecpi(C)

For outcome 1, the resources earned does not change. For outcomes 2 and 3, the resources earned increases due to an increase in the second ecpi, where ecpi refers to an "effective cost per impression" or an effective resource reduction amount per impression. The ecpi of a CPM campaign is the bid of that campaign, while the ecpi of a CPC campaign is the bid multiplied by the predicted user selection rate (whether adjusted or not), while the ecpi of a CPV campaign is the bid multiplied by the predicted user view rate (whether adjusted or not).

Offline Learning

In an embodiment, the attention model is learned using one or more machine learning techniques. Example machine learning techniques include linear regression, logistic regression, support vector machines (SVMs), gradient boosting decision trees, and artificial neural networks. The one or more machine learning techniques may be different than the one or more machine learning techniques used to train the predicted user interaction model (or p(interaction attention)). Whichever machine learning technique is used, because there is no true label of whether a user pays attention to a content item, the attention model is fit along with predicted user interaction rates. Presuming that p(attention) follows an exponential distribution, an objective is to learn the weight vector W to minimize a loss function, which, in an embodiment, is the mean square error between the new predicted user interaction rate (pctr) and an observed user interaction rate (octr):

$$L = \sum_i (p(\text{attention}) * pctr_i - octr_i)^2$$

where $p(\text{attention}) = \exp^{(-w^T x)}$ where X is the impression count at various levels of granularity, T is a transpose operation on weight vector W, $pctr_i$ is the predicted user interaction rate of content item i, and $octr_i$ is the predicted user interaction rate of content item i.

Training data that is used to train the attention model comprises, for each training instance that corresponds to an impression of a content item with respect to a particular user, a predicted user interaction rate of the content item (e.g., computed at the time of the impression and with respect to the particular user), and an impression count of the content item (with respect to the particular user) at the time of the impression. The label is whether there was an interaction by the particular user with the content item, such as a click or a view.

In an embodiment, one or more features of the attention model includes one or more impression counts at different levels of granularity. For example, a campaign-level impression count and/or a content provider-level impression count may be features of the attention model. Thus, a count of how many times a particular user has seen a content item from a particular content provider and/or a count of how many times the particular user has seen a content item from a particular content delivery campaign are maintained. Thus, each training instance may include a user-content item impression count, a user-campaign impression count, and/or a user-content provider impression count.

In an embodiment, the attention model is an ensemble model that crosses multiple timespans. Example timespans include the most recent one day, the most recent two days, the most recent seven days, and the most recent fourteen days. For each timespan, one or more impression counts are determined. For example, for the 1-day timespan, a first user-content item impression count is determined (e.g., using impression data) and a first user-campaign impression count is determined, while for the 7-day timespan, a second user-content item impression count is determined and a second user-campaign impression count is determined. Given a particular pairing of a user with a content item, a campaign, or a content provider, the impression counts of that pairing for longer timespans should be the same as or greater than the impression counts of that pairing for shorter timespans. An example attention model ensemble is as follows:

$$p(\text{attention}) = \text{alpha} * p(\text{attention}|\text{timespan}=2\text{-day}) + (\text{beta}) * p(\text{attention}|\text{timespan}=7\text{-day}) + (1-\text{alpha-beta}) * p(\text{attention}|\text{timespan}=14\text{-day})$$

where alpha and beta are weights that may be established manually or may be machine learned.

An alternative to using an attention model ensemble is to use impression counts for different timespans as features in a single attention model.

Examples of other types of features upon which the attention model may be based include a time gap between the current time and the last time the content item was presented to the user, whether the content item is from a content provider with which the user has an affinity (e.g., the user "follows" or "liked" the content provider or the content provider is associated with an industry that is associated with the user's job industry), whether the content item is selected as a result of audience expansion (thus, the user does not match the targeting criteria of the content delivery campaign that includes the content item), and whether the user is highly targeted (e.g., targeted by over fifty content delivery campaigns), moderately targeted (e.g., targeted by between fifty and ten content delivery campaigns), or low targeted (e.g., targeted by less than ten content delivery campaigns). Each of these features may impact a user's tolerance level to the frequency of impressions.

In an embodiment, multiple attention models are created based on different user attribute/dimension values, different content item attribute/dimension values, and/or different crosses or intersections of user attributes and content item attributes. For example, one attention model is trained for users who live in the United States and have a job title that belongs to a particular job industry, while another attention model is trained for users who live in South America and have a job title that belongs to a different job industry, while another attention model is trained for users who live in Europe and for content items from a particular group of content providers.

Online Scoring

Figure 3:
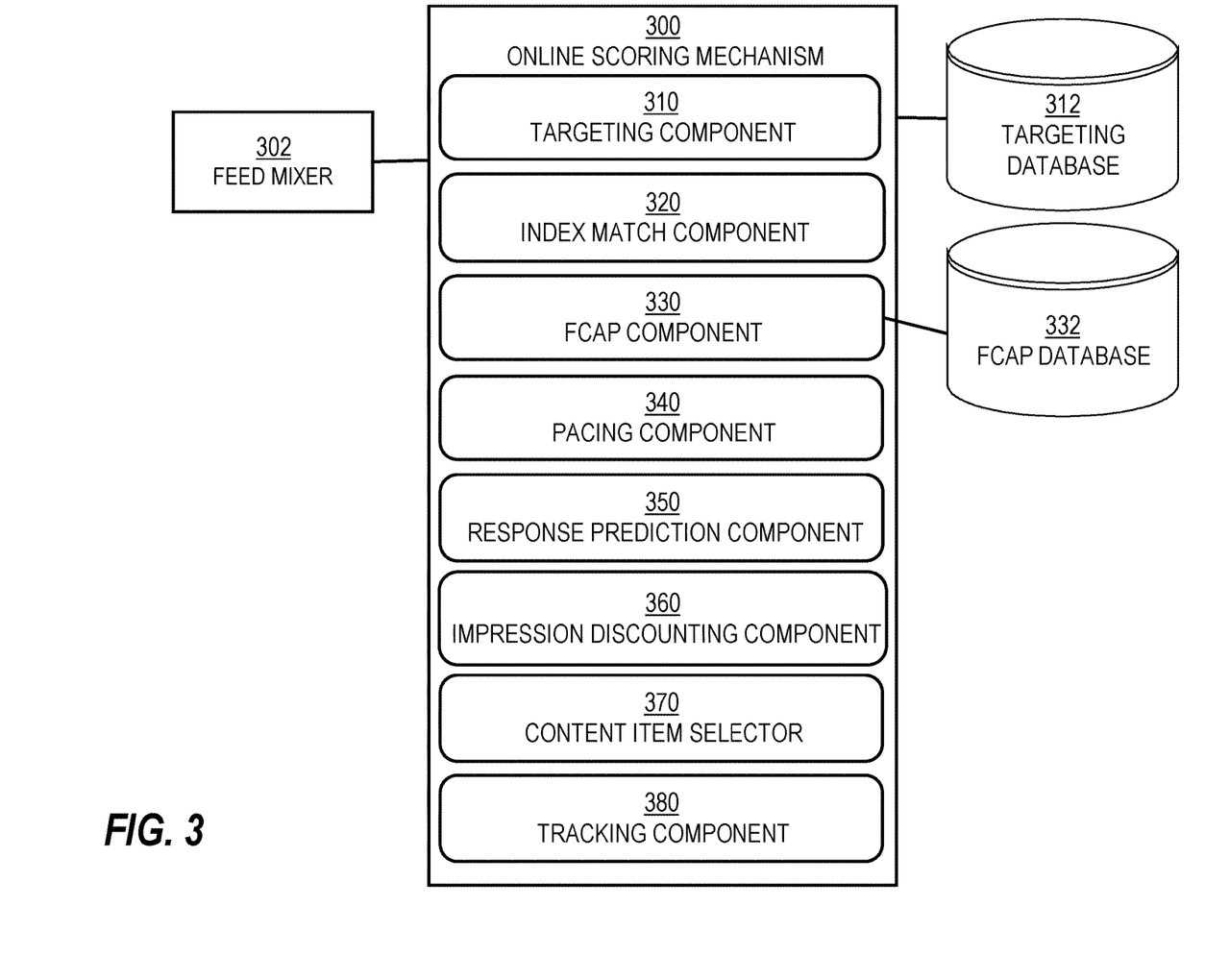
FIG. 3 is a block diagram of an example online scoring mechanism, in an embodiment.

FIG. 3 is a block diagram of an example online scoring mechanism 300, in an embodiment. Online scoring mechanism 300 is part of content delivery system 120. Online scoring mechanism 300 receives and processes a content item request from a feed mixer 302. Feed mixer 302 may be part of publisher system 130 that sends, to online scoring mechanism 300, requests to retrieve one or more content items to include in a content item feed that includes other types of content items, such as content items that include user-generated (or member-generated) content or that include links to online content, such as web articles, blog posts, or entity profiles (e.g., company page profile or member profile).

Online scoring mechanism 300 comprises a targeting component 310, an index matching component 320, an FCAP component 330, a pacing component 340, a response prediction component 350, an impression discounting component 360, a content item selector 370, and a tracking component 380.

Targeting component 310 handles standardization of different criterion of a set of targeting criteria of each content delivery campaign and stores campaign data of each campaign in targeting database 312. Targeting component 310 performs its functions relative to content delivery campaigns before a content request associated with a user that those campaigns target is processed by content delivery exchange 124.

Index matching component 320 determines which content delivery campaigns a user is eligible to see. The member ID (if one exists) in a call from feed mixer 302 is used to identify (e.g., from targeting database 312) one or more content delivery campaigns that target (or include) the member ID. (The call initiates a content item selection event.) If a member ID is not included in the targeting of any content delivery campaign, then processing of the content item selection event may end. If multiple content delivery campaigns are identified, then the content item selection event may be a "mixed" content item selection event, which is one that includes two campaigns of different charging types. For example, at least one content delivery campaign is a CPC campaign and at least one content delivery campaign is a CPM campaign.

FCAP component 330 removes any identified content delivery campaigns whose content items have already been presented to the member a threshold number of times. FCAP database 332 may store updated information about which content items have been presented to which members over a period of time, such as the last week. FCAP database 332 may be updated regularly as impressions are occurring and older impressions are removed or at least not considered based on an associated timestamp. A single f-cap rule may be applied to all content delivery campaigns hosted by content delivery system 120. For example, one f-cap rule might indicate that no content item may be presented to a member more than three times in five days. Alternatively, different content providers may be associated with different f-caps. Also, different campaigns may be associated with different f-caps rules. Such f-cap rules may also be specified in FCAP database 332 or may be specified in a configuration file that is accessible to FCAP component 330.

Pacing component 340 spreads out spending of campaigns over a time period, such as a day. For example, if the remaining budget of a candidate content delivery campaign is below where the budget spend was predicted to be at the current point in the time period, then the candidate content delivery campaign may be filtered so that it is not selected for presentation in a content item selection event, whether conducted locally by content delivery exchange 124 or remotely, by a third-party exchange. Such filtering or "pacing" is performed to ensure that a campaign's budget is not exhausted too quickly.

Response prediction component 350 determines, for each candidate content delivery campaign, a prediction of whether the user in question will interact with (e.g., select or view) the candidate content delivery campaign. Response prediction component 350 may implement a prediction model that is trained using one or more machine learning techniques and that is built on multiple features, such as those described herein. Thus, if there are ten candidate content delivery campaigns that are part of the content item selection event, then response prediction component 350 may be invoked ten times. Response prediction component 350 might not be invoked for any candidate CPM campaign, since content providers of those campaigns are charged only per impression instead of per interaction. Instead, a response prediction for CPM campaigns.

Impression discounting component 360 determines, for each determined prediction, a discount amount to apply to the determined prediction. Alternatively, impression discounting component 360 takes, as input, a determined prediction for a candidate campaign and a number of previous impressions of a content item of the candidate campaign to the user in question, (and, optionally, one or more other feature values, such as a time gap value) and produces an adjusted prediction. In an embodiment, impression discounting is applied to CPM campaigns since repeated impressions of content items from such campaigns can also cause users to not pay attention to them.

Content item selector 370 selects the top N content items from among the top N candidate content delivery campaigns. The criteria for selecting may be based on ecpi. For example, the top N candidate content delivery campaigns may have the highest ecpi value relative to the other candidate content delivery campaigns in the content item selection event.

Tracking component 380 generates an impression tracking URL and a click tracking URL for the selected content item(s), an example of a tracking URL is as follows:

https://rtb-us-east.linkedin.com/lax/clk?trk=TRK&
laxbid=LAX_BID&eid=E_ID&emadid=EMAD_ID
&laxerid=LAXE_RID&adfmt=AD_FMT&aui=AUI&
abi=&wp=WP&url=URL&urlhash=URLHASH;
client=IP_ID where TRK, LAX_BID, E_ID, EMAD_ID, LAXE_RID, AD_FMT, AUI, WP, URL, URLHASH, IP_ID are macros that are populated at serving time with real values. TRK is an encrypted tracking URL that is internal to the exchange service and contains information about the click, the selected campaign, and the selected content item; LAX_BID is a bid value (e.g., 2), E_ID is an ID of a third-party exchange (if one initiated the content item selection event); EMAD_ID is an encrypted Mobile Advertising ID (MAID) (and may be many characters long); LAXE_RID is a request ID of the request from the third-party exchange (if one initiated the content item selection event); AD_FMT is a format of the content item (and may be reflected with a single digit); AUI is an ID of the content item selection event; WP is the win price of the content item selection event; URL is the landing page URL which is replaced with a third-party tracking service URL, an example of which is below; URLHASH is the hashed version of the TRK URL above (for validating the URL on the exchange service side); and IP_ID is the IP address of the client device.

In an embodiment, for each content item selection event, an event data item is stored that indicates an event identifier that uniquely identifies the content item selection event, a timestamp that indicates a date and time of the event, an entity/user identifier of the entity that initiated the event, a client device identifier (e.g., a browser identifier, a MAID, and/or an IP address), a content delivery campaign identifier of each selected content item, and, for each selected content item, a bid amount, one or more impression counts (e.g., content item-level, campaign-level, and content provider-level), a predicted (raw or unadjusted) user interaction rate, and an adjustment or an adjusted user interaction rate (which may be the product of the predicted user interaction rate and the adjustment). The event data item is stored along with other event data items, which may be used for subsequent analysis.

Example Process

Figure 4:
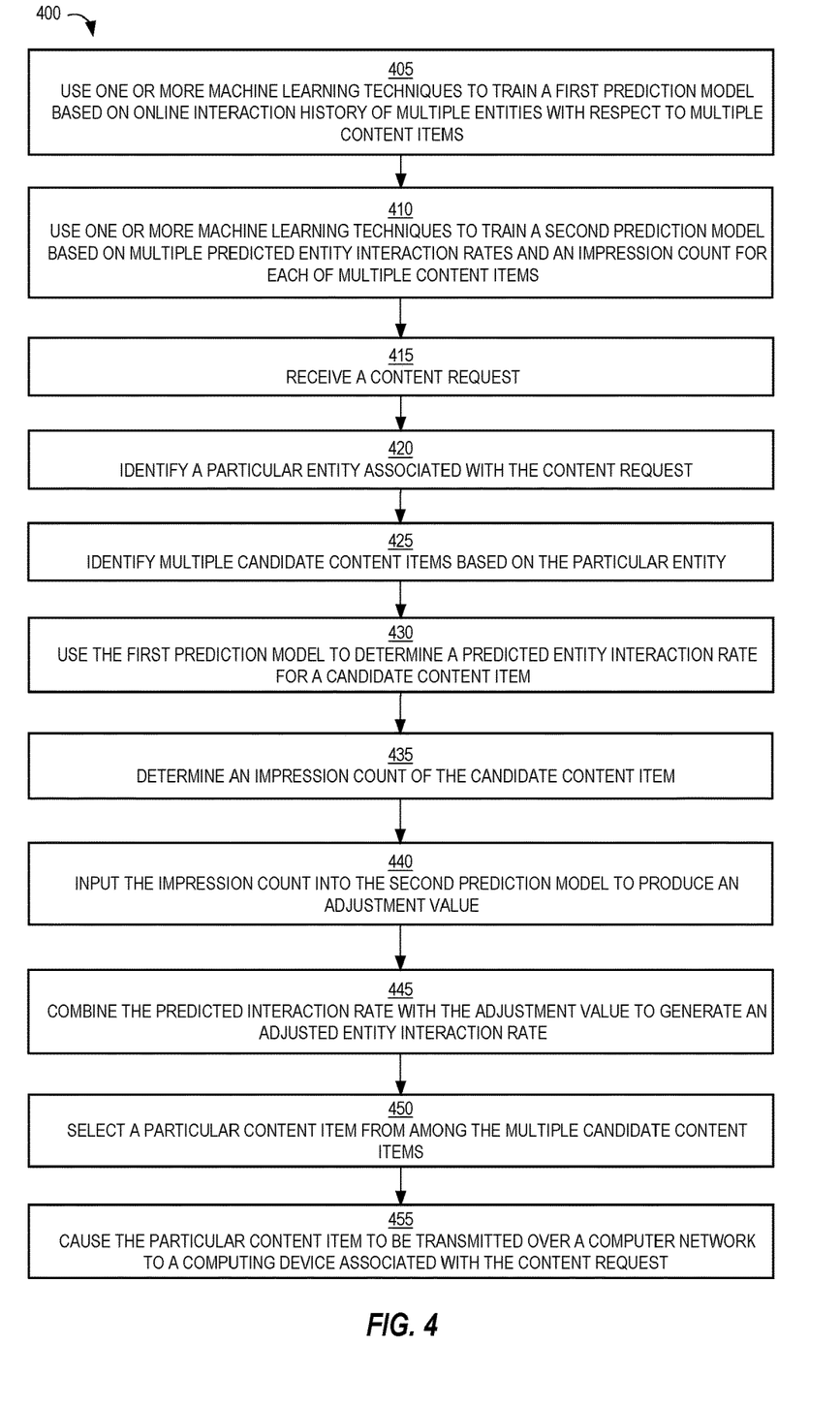
FIG. 4 is a flow diagram that depicts an example process for using impression counts in generating predicted entity interaction rates, in an embodiment.

FIG. 4 is a flow diagram that depicts an example process 400 for using impression counts in generating predicted entity interaction rates, in an embodiment. Part of process 400 may be implemented by an offline system (not depicted in FIG. 1) affiliated with content delivery system 120 and another part of process 400 may be implemented by an online system, which may be part of content delivery system 120.

At block 405, one or more machine learning techniques are used to train a first prediction model based on online interaction history of multiple entities with respect to multiple content items. Multiple features of the first prediction model include attributes of those content items and attributes of those entities. The training data that is used to train the first training model may comprise, for each training instance corresponding to a pair of a particular entity and a particular content item, a label indicating whether the particular entity interacted with (e.g., clicked on or viewed) the particular content item, and features about the particular entity and feature values about the particular content item.

At block 410, one or more machine learning techniques are used to train a second prediction model based on a plurality of predicted interaction rates, a plurality of actual interaction rates, and an impression count for each of multiple content items. The training data that is used to train the first training model may comprise, for each training instance corresponding to an impression of a content item, a label value indicating whether the impression resulted in a user interaction and one or more features described earlier.

At block 415, a content request is received. The content request may originate from publisher system 130, client device 142, or an intermediate component, such as in content delivery system 120. The content request may be an HTTP request if the content request is from an entity or third-party external to content delivery system 120. Alternatively, the content request may be an API call that online scoring mechanism 300 receives from a component of content delivery system 120 or from feed mixer 302.

At block 420, in response to receiving the content request, a particular entity associated with the content request is identified. For example, the content request may include an entity identifier (e.g., a member ID) or a mobile identifier, such as a browser identifier, an IP address, a MAC address, or a mobile advertising identifier (MAID).

At block 425, multiple candidate content items are identified based on the particular entity. For example, an entity identifier of the particular entity may be listed in multiple content delivery campaigns, each of which targets multiple entities satisfying certain targeting criteria. Thus, the entity identifier is used to look up these content delivery campaigns. Some content delivery campaigns may include multiple content items, one or more of which may be eligible to be presented to the particular entity. Block 425 marks the beginning of a content item selection event.

At block 430, for each of the multiple candidate content items, the first prediction model is used to determine a predicted interaction rate. Block 430 may involve inputting features values associated with the candidate content item and feature values associated with the particular entity into the first prediction model, which produces the predicted interaction rate.

At block 435, an impression count of the candidate content item with respect to the particular entity is determined. The impression count may be for all time (i.e., how many times has the candidate content item been presented to the particular entity) or over a particular period of time, such as the last two weeks.

At block 440, the impression count is input to the second prediction model, which outputs an adjustment value. The second prediction model may take other feature values as input, such as multiple impression counts and/or a time gap that is a value that is based on difference between the current time and a previous time that the candidate content item was presented to the particular entity.

At block 445, the predicted interaction rate is combined with the adjustment value to generate an adjusted entity interaction rate. For example, the prediction interaction rate is multiplied by the adjustment value, which, at least for impression counts greater than zero, may be between zero and one.

Blocks 435-445 are repeated for each candidate content item.

At block 450, a particular content item is selected from among the multiple candidate content items. The selection is based on the adjusted entity interaction rate computed for each candidate content item. For example, block 450 may involve ordering the candidate content items based on their respective adjusted entity interaction rates and then selecting the top N ranked candidate content items. Alternatively, for each candidate content item, a product of an adjusted entity interaction rate and a corresponding resource reduction amount (e.g., a bid amount) of the candidate content item is computed and the candidate content items are ordered based on the respective products.

At block 455, the particular content item is transmitted over a computer network to a computing device associated with the content request. For example, online scoring mechanism 300 informs feed mixer 302 about the particular content item and transmits the particular content item (or links to the particular content item) over the Internet to a computing device that triggered or initiated the content request.

In a related embodiment, instead of training and relying on two different prediction models to compute adjusted predicted entity interaction rates, a single prediction model is trained and used. The single prediction model is based not only on user features and content item features, but also on multiple impression count features, such as an impression count for the content item in question, an impression count for content items belonging to the same content delivery campaign to which the content item in question belongs, and/or an impression count for content items from the same content provider that provided the content item in question. The prediction model may also be based on other impression-related features, such as time gap.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
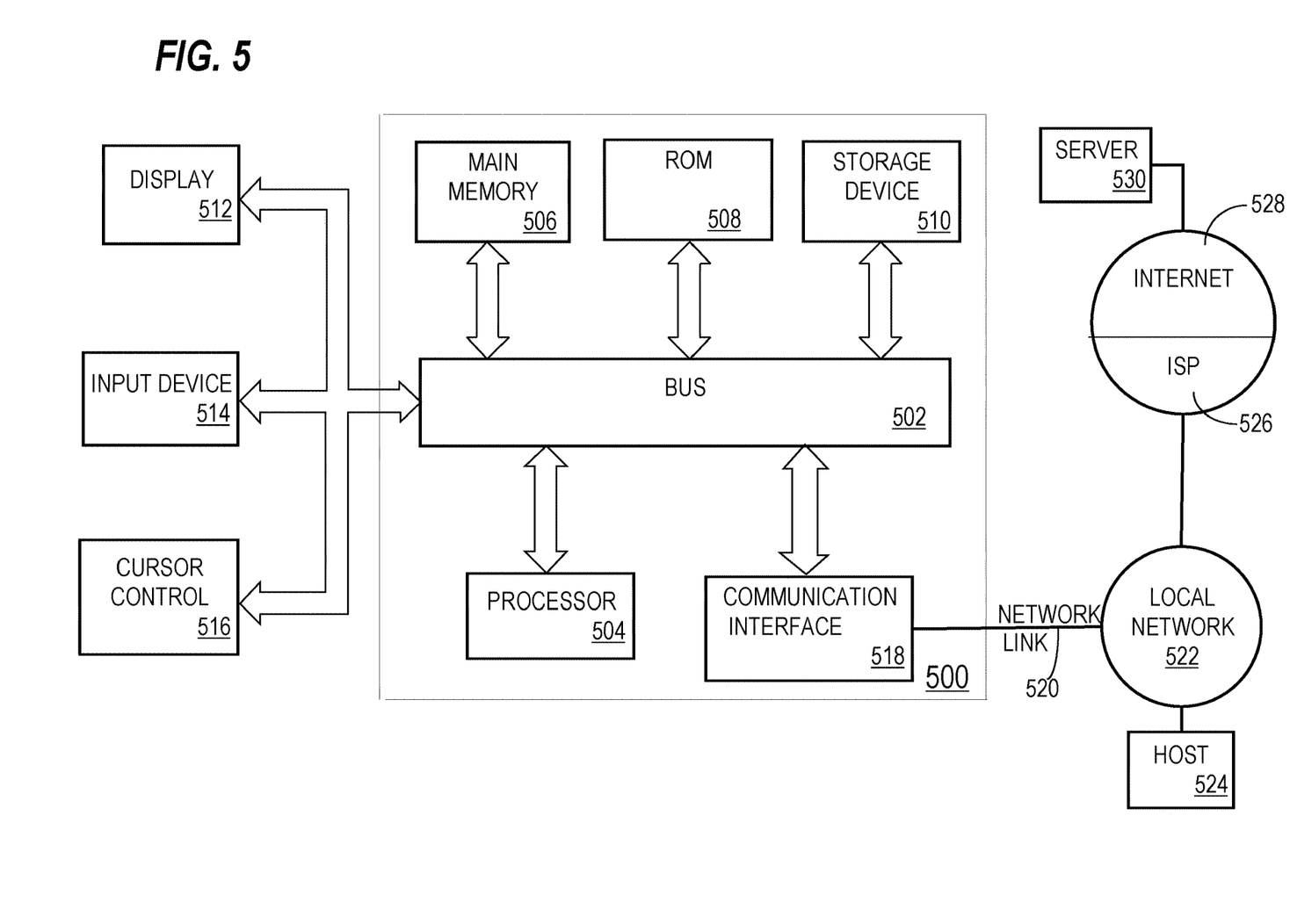
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using one or more machine learning techniques to train a first prediction model based on interaction history of a plurality of content items by a plurality of entities, first attributes of the plurality of content items, and second attributes of the plurality of entities;
   using one or more machine learning techniques to train a second prediction model based on a plurality of predicted interaction rates and an impression count for each of multiple content items;
   in response to a content request:
      identifying a particular entity associated with the content request;
      identifying a plurality of candidate content items;
      for each candidate content item in the plurality of candidate content items:
         using the first prediction model to determine a predicted interaction rate;
         determining a particular impression count of said candidate content item with respect to the particular entity;
         generating, by the second prediction model and the particular impression count as input to the second prediction model, an adjustment;
         combining the predicted interaction rate with the adjustment to generate an adjusted entity interaction rate;
      selecting a particular content item from the plurality of candidate content items based on the adjusted entity interaction rate associated with the particular content item;
      causing the particular content item to be transmitted over a computer network to a computing device associated with the content request;
   wherein the method is performed by one or more computing devices.

2. The method of claim 1, wherein the second prediction model is based on an impression count of a group of content items.

3. The method of claim 2, wherein:
   the group of content items is part of a content delivery campaign;
   the particular impression count is a first impression count;
   the method further comprising determining a second impression count of content items in the group of content items with respect to the particular entity;
   generating the adjustment is also based on the second impression count.

4. The method of claim 2, wherein:

the content items in the group of content items are from different content delivery campaigns provided by a particular content provider the particular impression count is a first impression count;

the method further comprising determining a second impression count of content items in the group of content items with respect to the particular entity;

generating the adjustment is also based on the second impression count.

5. The method of claim 1, wherein:

the second prediction model is based on a time gap of when a content item was last presented to a corresponding entity;

the method comprising determining a particular time gap of said each candidate content item;

the particular time gap is based on a difference between a current time and a previous time that said each candidate content item was presented to the particular entity;

generating the adjustment is also based on the particular time gap as input to the second prediction model.

6. The method of claim 1, further comprising, prior to selecting the particular content item:

identifying a frequency cap rule;

determining, based on the frequency cap rule, to remove a certain candidate content item from the plurality of candidate content items.

7. The method of claim 1, further comprising:

identifying a resource reduction amount associated with said each candidate content item;

inserting the resource reduction amount and the adjusted entity interaction rate into an operation to generate an effective resource reduction amount per impression;

ordering the plurality of candidate content items based on the effective resource reduction amount per impression to determine an ordered set of candidate content items;

wherein selecting the particular content item is based on the ordered set of candidate content items.

8. The method of claim 1, further comprising:

in response to receiving the content request, determining whether a certain impression count for a certain candidate content item with respect to the particular entity is zero;

using the first prediction model to determine a particular predicted entity interaction rate for the certain candidate content item;

identifying a freshness booster factor;

in response to determining that the certain impression count is zero, adjusting the particular predicted entity interaction rate based on the freshness booster factor.

9. A method comprising:

using one or more machine learning techniques to train a prediction model based on interaction history of a plurality of content items by a plurality of entities, an impression count for each of multiple content items, and an impression count for each group of content items of multiple groups of content items;

in response to a content request:

identifying a particular entity associated with the content request;

identifying a plurality of candidate content items;

for each candidate content item in the plurality of candidate content items:

determining a first impression count of said candidate content item with respect to the particular entity;

determining a second impression count of a group of content items, that includes the candidate content item, with respect to the particular entity;

generating, based on the first impression count and the second impression count as input to the prediction model, a predicted entity interaction rate;

selecting a particular content item from the plurality of candidate content items based on the predicted entity interaction rate associated with the particular content item;

causing the particular content item to be transmitted over a computer network to a computing device associated with the content request;

wherein the method is performed by one or more computing devices.

10. The method of claim 9, wherein:

the prediction model is based on a time gap of when a content item was last presented to a corresponding entity;

the method comprising determining a particular time gap of said each candidate content item;

the particular time gap is based on a difference between a current time and a previous time that said each candidate content item was presented to the particular entity;

the particular time gap is input to the prediction model.

11. The method of claim 9, further comprising, prior to selecting the particular content item:

identifying a frequency cap rule;

determining, based on the frequency cap rule, to remove a certain candidate content item from the plurality of candidate content items.

12. The method of claim 9, further comprising:

identifying a resource reduction amount associated with said each candidate content item;

inserting the resource reduction amount and the predicted entity interaction rate into an operation to generate an effective resource reduction amount per impression;

ordering the plurality of candidate content items based on the effective resource reduction amount per impression to determine an ordered set of candidate content items;

wherein selecting the particular content item is based on the ordered set of candidate content items.

13. One or more storage media storing instructions which, when executed by one or more processors, cause:

using one or more machine learning techniques to train a first prediction model based on interaction history of a plurality of content items by a plurality of entities, first attributes of the plurality of content items, and second attributes of the plurality of entities;

using one or more machine learning techniques to train a second prediction model based on a plurality of predicted interaction rates and an impression count for each of multiple content items;

in response to a content request:

identifying a particular entity associated with the content request;

identifying a plurality of candidate content items;

for each candidate content item in the plurality of candidate content items:

using the first prediction model to determine a predicted interaction rate;

determining a particular impression count of said candidate content item with respect to the particular entity;

generating, by the second prediction model and the particular impression count as input to the second prediction model, an adjustment;

combining the predicted interaction rate with the adjustment to generate an adjusted entity interaction rate;

selecting a particular content item from the plurality of candidate content items based on the adjusted entity interaction rate associated with the particular content item;

causing the particular content item to be transmitted over a computer network to a computing device associated with the content request.

14. The one or more storage media of claim 13, wherein the second prediction model is based on an impression count of a group of content items.

15. The one or more storage media of claim 14, wherein:
the group of content items is part of a content delivery campaign;
the particular impression count is a first impression count;
the instructions, when executed by the one or more processors, further cause determining a second impression count of content items in the group of content items with respect to the particular entity;
generating the adjustment is also based on the second impression count.

16. The one or more storage media of claim 14, wherein:
the content items in the group of content items are from different content delivery campaigns provided by a particular content provider
the particular impression count is a first impression count;
the instructions, when executed by the one or more processors, further cause determining a second impression count of content items in the group of content items with respect to the particular entity;
generating the adjustment is also based on the second impression count.

17. The one or more storage media of claim 13, wherein:
the second prediction model is based on a time gap of when a content item was last presented to a corresponding entity;
the instructions, when executed by the one or more processors, further cause determining a particular time gap of said each candidate content item;
the particular time gap is based on a difference between a current time and a previous time that said each candidate content item was presented to the particular entity;
generating the adjustment is also based on the particular time gap as input to the second prediction model.

18. The one or more storage media of claim 13, wherein the instructions, when executed by the one or more processors, further cause, prior to selecting the particular content item:
identifying a frequency cap rule;
determining, based on the frequency cap rule, to remove a certain candidate content item from the plurality of candidate content items.

19. The one or more storage media of claim 13, wherein the instructions, when executed by the one or more processors, further cause:
identifying a resource reduction amount associated with said each candidate content item;
inserting the resource reduction amount and the adjusted entity interaction rate into an operation to generate an effective resource reduction amount per impression;
ordering the plurality of candidate content items based on the effective resource reduction amount per impression to determine an ordered set of candidate content items;
wherein selecting the particular content item is based on the ordered set of candidate content items.

20. The one or more storage media of claim 13, wherein the instructions, when executed by the one or more processors, further cause:
in response to receiving the content request, determining whether a certain impression count for a certain candidate content item with respect to the particular entity is zero;
using the first prediction model to determine a particular predicted entity interaction rate for the certain candidate content item;
identifying a freshness booster factor;
in response to determining that the certain impression count is zero, adjusting the particular predicted entity interaction rate based on the freshness booster factor.

* * * * *

UNITED STATES PATENT AND TRADEMARK OFFICE
CERTIFICATE OF CORRECTION

PATENT NO. : 11,093,861 B2  Page 1 of 1
APPLICATION NO. : 16/359914
DATED : August 17, 2021
INVENTOR(S) : Jinyun Yan et al.

It is certified that error appears in the above-identified patent and that said Letters Patent is hereby corrected as shown below:

On the Title Page

Item (57), Lines 1-2:
"Techniques for controlling item frequency using machine learning are provides." should read
-- Techniques for controlling item frequency using machine learning are provided. --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*